Oct. 12, 1971    W. F. WALTER ET AL    3,611,477
CHITTERLINGS SCRUBBER

Filed Sept. 12, 1969    2 Sheets-Sheet 1

Wallace F. Walter
Karl Oberdorfer
INVENTORS.

BY Schmidt, Johnson, Hovey,
Williams & Chase
ATTORNEYS.

Oct. 12, 1971                W. F. WALTER ET AL                3,611,477
                              CHITTERLINGS SCRUBBER
Filed Sept. 12, 1969                                     2 Sheets-Sheet 2

Wallace F. Walter
Karl Oberdorfer
        INVENTORS.

BY Schmidt, Johnson, Hovey,
    Williams & Chase
              ATTORNEYS.

:::::::::::::::::::::::::::::::::::::::::::::::::::::::::::::::
United States Patent Office 3,611,477
Patented Oct. 12, 1971

3,611,477
CHITTERLINGS SCRUBBER
Wallace F. Walter, 2743 Fontenelle Blvd., Omaha, Nebr. 68104, and Karl Oberdorfer, 24 Charles St., Council Bluffs, Iowa 51501
Filed Sept. 12, 1969, Ser. No. 857,362
Int. Cl. A22c *17/16*
U.S. Cl. 17—43                                      14 Claims

ABSTRACT OF THE DISCLOSURE

A cleaner for chitterlings comprises an elongated trough having a longitudinally corrugated inner surface and an elongated, rotary cleaning drum received within the trough having a longitudinally corrugated outer surface. The corrugations of the two surfaces produce a scrubbing effect on the chitterlings which are introduced into the trough, and a cleaning fluid spray directed along the drum advances the chitterlings through the trough. Contaminated fluid is continuously removed from the trough by a series of drain openings and overflow means, the latter also serving to maintain a constant level of cleaning fluid in the trough.

---

This invention relates to apparatus for cleaning animal tissue such as the intestines of hogs from which edible products such as chitterlings may be obtained. The chitterlings vary in size from approximately 4 inches to 28 inches in length. They contain dirt and partially digested food which adheres to the fatty tissues of the chitterlings and renders the cleansing thereof extremely difficult. The revenue obtainable from edible pork products such as chitterlings is presently approximately eight times that which is obtainable for inedible products. It is, therefore, economically important that the chitterlings be rendered sufficiently clean for human consumption if possible.

Conventionally, the chitterlings are initially split and the contents removed by a water-flushing method. Further cleaning is necessary and has heretofore been carried out by use of a batch-type rotary washer. The inherent consistency of the very fine and thin layers of animal tissues comprising products of this type has resulted in inefficiency of the batch-type cleaning process because of the tendency of the tissues to nest or cling together during the washing and rinsing action. The dirt particles have little opportunity to escape from the products unless a major portion of the fatty tissue is initially removed from the chitterlings by hand. This further reduced the recovery of the usable product.

Accordingly, it is an important object of this invention to provide apparatus capable of efficiently removing dirt and contaminating material from animal products such as chitterlings. In the carrying out of this object, it is also an aim of the invention to provide a cleaner capable of effectively separating and promptly removing the dirt and contaminants with the washing fluid to avoid further contamination of other products during the cleaning operation.

Another object of the invention is to provide a cleaner having a unique scrubbing action on the animal tissue to agitate the products to expose all of the surfaces continuously and repeatedly to the cleansing action during advancement through the apparatus.

Still another object of the invention is to provide a cleaner which enhances the rate at which products of this type may be effectively cleaned and yet which maximizes the amount of edible products recovered after the cleaning operation.

These and other important objects will be more fully explained or will become apparent from the specification to follow.

Figure 1:
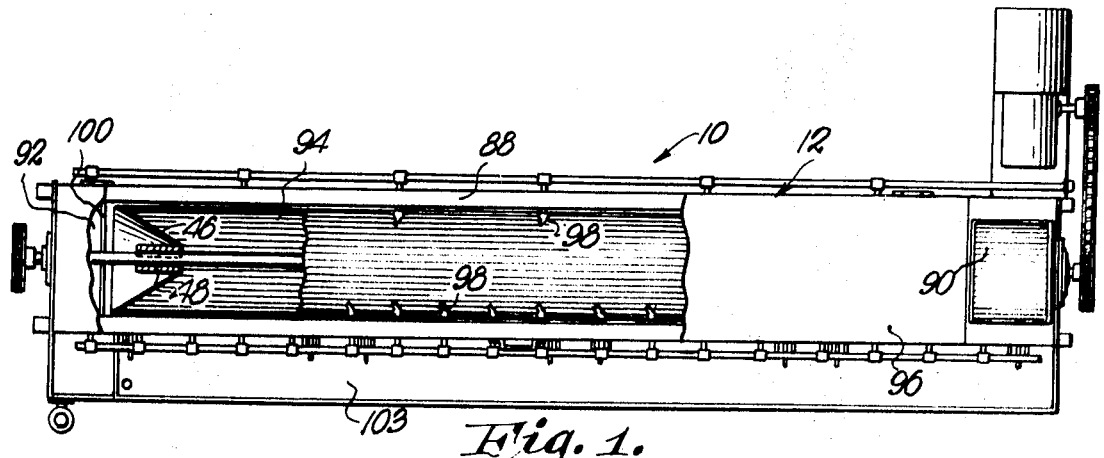
Figure 2:
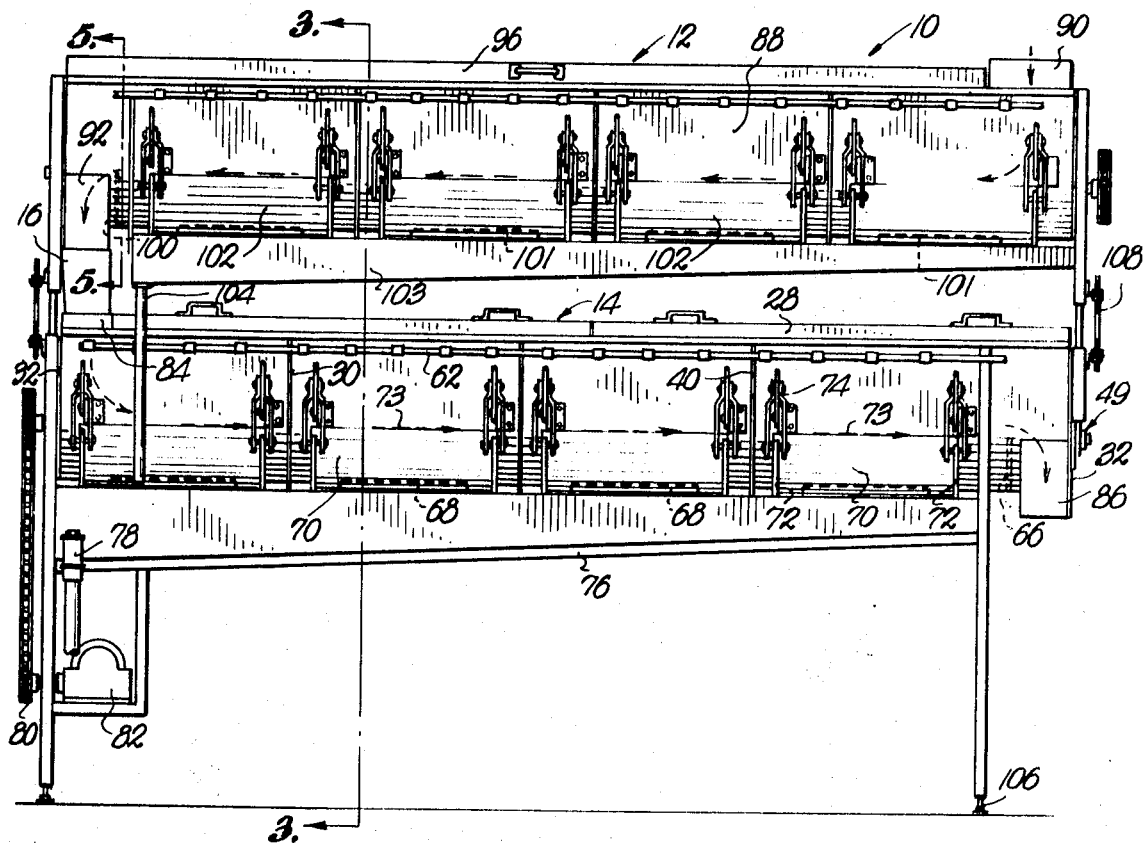
Figure 3:
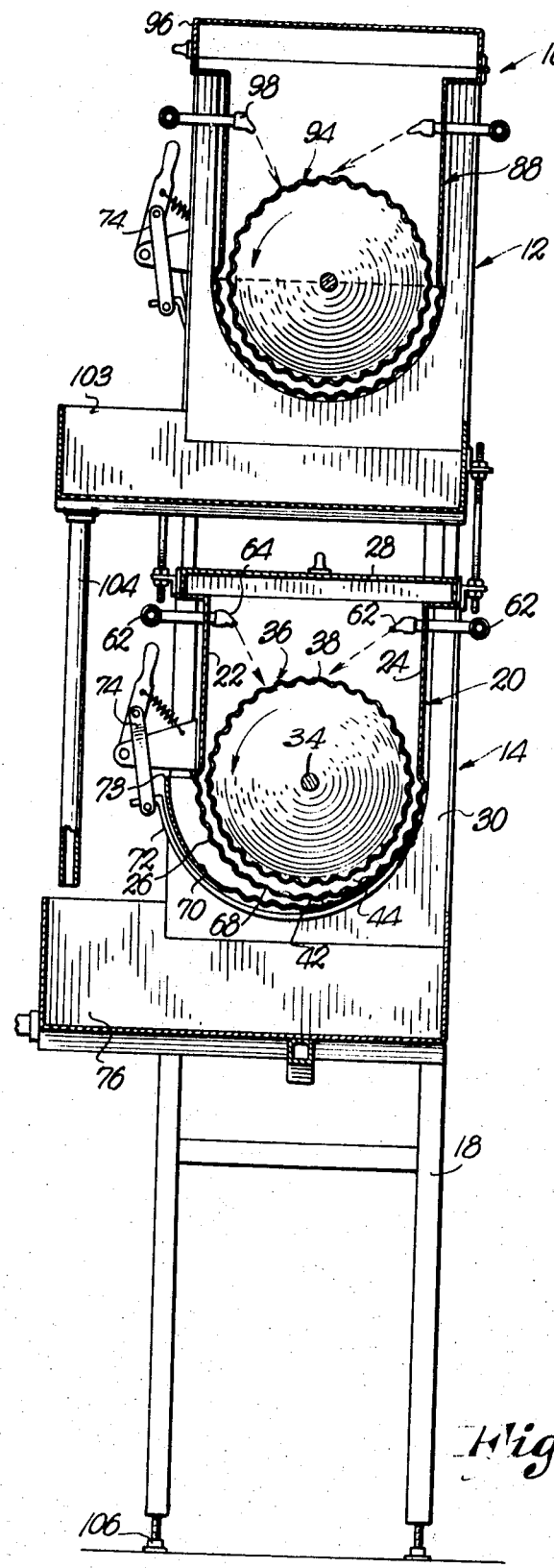
Figure 4:
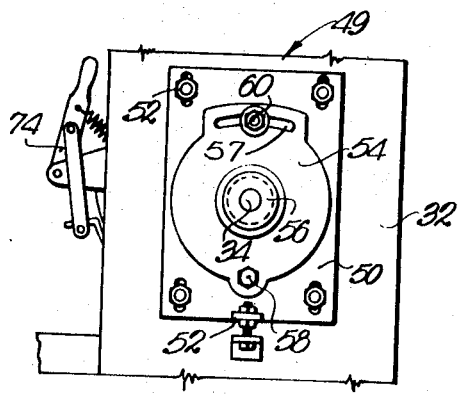
Figure 5:
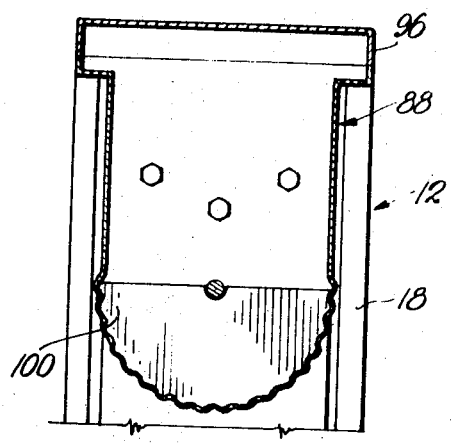

In the drawings:
FIG. 1 is a top plan view of a machine embodying the principles of the present invention;
FIG. 2 is a side elevational view of the machine showing the upper and lower cleaning units;
FIG. 3 is an enlarged, vertical, cross-sectional view taken along line 3—3 of FIG. 2;
FIG. 4 is an enlarged, fragmentary, end view of the lower cleaning unit showing the structure for adjusting the position of the rotary cleaning drum; and
FIG. 5 is an enlarged, fragmentary, vertical, cross-sectional view taken along line 5—5 of FIG. 2.

The machine embodying the principles of this invention is broadly designated 10 and comprises a pair of substantially identical, vertically spaced cleaning units 12 and 14 interconnected by a chute 16. The lower unit 14 is supported above the floor of a processing plant or factory by a frame 18, and includes an elongated, transversely generally U-shaped, tissue-receiving trough 20, initially formed from sheet material and presenting a pair of sidewalls 22 and 24 and an arcuate bottom wall 26 spanning the distance therebetween. Sidewalls 22 and 24 are adapted at their upper ends for receiving and supporting a pair of removable lids 28 covering the length of trough 20. A plurality of U-shaped braces 30 are rigidly secured to the frame 18 at spaced intervals along the length of unit 14 and receive the trough 20.

Suitable end walls 32 close each end of the trough 20 and support the elongated, axial shaft 34 of a rotary cleaning drum 36 which is received within trough 20 in spaced relationship to the walls 22–26. The drum 36 is provided with a plurality of undulations or corrugations 38 on its outer surface which extend longitudinally thereof in opposition to longitudinally extending undulations or corrugations 42 on the inner surface of bottom wall 26. It may be seen that with the drum 36 disposed in this manner within trough 20, a longitudinal passage 44 is presented between the opposing corrugations 38 and 42 for advancement of material such as chitterlings therethrough.

Drum 36 is mounted on shaft 34 for rotation therewith and, to this end, the drum 36 has inwardly projecting, conical end sections which are rigidly secured to shaft 34 by retainer sleeves in the same manner as the end section 46 and sleeve 48 of the upper unit 12 (FIG. 1) to be subsequently described. Adjustment structure 49 is provided on each end wall 32 for varying the disposition of drum 36 within trough 20 (FIG. 4). Structure 49 includes a vertically shiftable mounting plate 50 secured to each end wall 32 by adjusting bolts 52, the plate 50 supporting a disc 54 carrying bearing means 56 which journals the shaft 34. Disc 54 has an arcuate, peripheral slot 57 therein and is pivotal on plate 50 about pin or bolt means 58 upon loosening of a fastener 60 extending through slot 57.

An elongated pipe 62 is provided on each side of the trough 20 and extends longitudinally thereof for supplying cleaning fluid, such as water, from a pressurized fluid supply source (not shown). A series of nozzles 64 communicate with each of the pipes 62 at spaced intervals therealong and project into the trough 20, the nozzles 64 being aimed generally downwardly and toward the right end of the drum 36 (as viewed in FIG. 2) for directing the pressurized fluid along the length thereof. A semicircular baffle 66 extends across the trough 20 at such end, in spaced relationship to the adjacent end wall 32, and meets the bottom wall 26 to maintain a fluid-tight seal therewith (FIG. 2).

A longitudinally corrugated, transversely arcuate access door 70 is eccentrically hinged to bottom wall 26 beneath each opening 68 and functions as a fluid receiver for draining contaminated fluid from the passage 44. Each access door 70 is held in its normal, fluid-receiving position (FIG. 3) by a pair of retaining bands 72 and spring latches 74. In such positions the doors 70 drain fluid through openings 68 and retain the fluid until it overflows the outer edges 73 thereof into an inclined drain pan 76 beneath the length of trough 20, thereafter gravitating through a discharge 78 at the lower end of pan 76. It will be appreciated that in this manner the chitterlings are continuously bathed in fresh cleaning fluid circulating through trough 20 and are not permitted to soak in their own contaminated fluid. Furthermore, the elevation of the door edges 73, in cooperation with the baffle 66, maintains the fluid in trough 20 at a predetermined level to thereby assure that sufficient fluid for the cleaning function is at all times retained in the trough 20.

A chain and sprocket drive 80 interconnects the shaft 34 with a suitable prime mover 82 such as an electric motor or the like for rotating the drum 36 during operation of the machine. A chitterlings inlet 84 at the left end of the trough 20 (as viewed in FIG. 2) communicates the chute 16 with the trough 20, and a chitterlings discharge outlet 86 is provided at the opposite end of trough 20 between the baffle 66 and the adjacent end wall 32.

As previously mentioned, the upper cleaning unit 12 is substantially identical in construction and operation to that of the lower cleaning unit 14. Unit 12 is supported above unit 14 by members of the frame 18 and includes a trough 88 identical to trough 20 having a chitterlings inlet 90 at the right end thereof (FIG. 2) and a chitterlings discharge outlet 92 at the opposite end thereof in communication with the chute 16. The trough 88 receives a rotary cleaning drum 94 identical to drum 36 which is adjustably mounted for rotation within the trough 88 and driven in a similar manner. A hinged lid 96 over trough 88 extends the length thereof.

Two rows of nozzles 98 are disposed in the trough 88 in the same manner as nozzles 64 in trough 20, and a baffle 100 (FIG. 5) is provided in trough 88 adjacent the chitterlings outlet 92. Contaminated fluid is drained from trough 88 through outlet openings 101 at spaced intervals therealong and into hinged receivers 102 in the same manner as in unit 14, and an inclined drain pan 103 beneath unit 12 receives the contaminated fluid overflow from receivers 102 and communicates with drain pan 76 of unit 14 by means of a discharge pipe 104.

The frame 18 is provided with feet 106 which may be vertically adjusted to longitudinally incline the lower unit 14 downwardly toward the baffle 66 as indicated by the fluid flow arrows in FIG. 2, in order to augment the advancement of cleaning fluid therethrough. Likewise, adjustable means 108 interconnecting the units 12 and 14 at the ends thereof permit longitudinal inclination of the upper unit 12.

In operation, the split chitterlings which have been initially cleansed of their contents are fed into the upper unit 12 through inlet 90 in trough 88. The chitterlings are immediately exposed to an agitation and scrubbing action similar to the action effected by an old-fashioned washboard in a laundering operation. The rotataion of the corrugated drum 94 relative to the corrugated surface of trough 88 repeatedly and successively squeezes and rubs the chitterlings throughout each revolution of drum 94. Meanwhile, a spray of cleaning fluid is directed into the trough 88 from the nozzles 98 and causes a predetermined fluid level to be maintained within trough 88 in which the chitterlings are cleansed. The force of the spray and the inclination of unit 12 enhance the advancement of the chitterlings longitudinally of the trough 88, contaminated fluid being continuously drained therefrom through the openings 101.

As the chitterlings approach the outlet end of trough 88 and they are advanced over the baffle 100 and gravitate through outlet 92 and chute 16 into the inlet 84 of trough 20. In lower unit 14, the chitterlings encounter squeezing and scrubbing action identical to that of unit 12 and are further cleansed as contaminated fluid is continually removed. When the chitterlings reach the discharge end of unit 14 they are advanced over baffle 66 and gravitate through outlet 86 into a suitable receptacle (not shown).

It may be seen that the corrugated nature of each access door 70 of unit 14 discourages the chitterlings from blocking the openings 68. Further, the eccentric relationship and subsequent tangential engagement between the doors 70 and bottom wall 26 adjacent the openings 68 prevent the chitterlings from becoming lodged therebetween by the force of the rotating drum 36 when the doors 70 are in their normal fluid-receiving positions. It is to be understood that the same advantages of the corrugated receiver surfaces and positioned relationship between the receivers 102 and the bottom wall of the trough 88 are realized in the upper unit 12.

Manifestly, inspection or periodic cleaning is facilitated by the provision of the removable lids and access doors on units 12 and 14. Further, it will be appreciated that the modular construction of machine 10 permits any number of cleaning units to be tiered one above the other as dictated by the degree of cleansing required by the chitterlings.

Having thus described the invention, what is claimed as new and desired to be secured by Letters Patent is:

1. A cleaner for animal tissue comprising:
   an elongated, tissue receiving trough having an inner surface;
   an elongated, closed end rotary cleaning element having an outer surface;
   means mounting said element in said trough for rotation of the element with the outer surface thereof spaced inwardly from and opposing said inner surface of the trough,
   said opposed surfaces defining a passage therebetween for advancement of the tissue longitudinally of the trough;
   means for supplying cleaning fluid to said passage;
   scrubbing means on at least one of said surfaces engageable with the advancing tissue in said passage to clean the tissue upon rotation of said element; and
   an elongated fluid receiver means beneath said trough communicating with said passage for draining contaminated fluid therefrom, said receiver means being provided with an overflow boundary for maintaining the fluid in said trough at a predetermined level.

2. The tissue cleaner as claimed in claim 1,
   said one surface being provided with a series of spaced-apart, longitudinally extending corrugations presenting said scrubbing means.

3. The tissue cleaner as claimed in claim 1,
   said inner and outer surfaces each being provided with a series of spaced-apart, longitudinally extending corrugations presenting said scrubbing means.

4. The tissue cleaner as claimed in claim 1,
   said fluid supply means including nozzle means adapted for coupling with a source of fluid under pressure,
   said nozzle means being disposed to direct pressurized fluid into said trough in a direction to effect said advancement of the tissue through the passage.

5. The tissue cleaner as claimed in claim 4,
   said one surface being provided with a series of spaced-apart, longitudinally extending corrugations presenting said scrubbing means,
   said nozzle means in said disposition having a directional component substantially parallel to said corrugations.

6. The tissue cleaner as claimed in claim 4,
   said trough being longitudinally inclined to augment said advancement of the tissue.

7. The tissue cleaner as claimed in claim 1,
   said mounting means including adjustable structure for varying the position of said element within the trough to regulate the scrubbing of the tissue as it advances through the passage.

8. The tissue cleaner as claimed in claim 1,
said receiver means extending longitudinally of said trough,
said trough having a bottom provided with outlet means along the length thereof communicating the passage with the receiver means for flow of the contaminated fluid thereinto.

9. The tissue cleaner as claimed in claim 8,
said receiver means including a door forming a part thereof which is hinged to the trough beneath the latter in disposition to provide access to said outlet means.

10. The tissue cleaner as claimed in claim 1, wherein said trough is provided with a generally transversely arcuate bottom having a series of longitudinally spaced outlets therein, said receiver means including a generally transversely arcuate portion for each outlet about said bottom in covering, spaced relationship to the respective outlet.

11. The tissue cleaner as claimed in claim 10, wherein each portion is disposed in eccentric relationship with said bottom such that the latter and the portion for each outlet converge as one side of the corresponding outlet is approached.

12. A cleaner for animal tissue comprising:
an elongated, tissue receiving trough having an inner surface;
an elongated, rotary, imperforate cleaning element having an outer surface;
means mounting said element in said trough for rotation of the element with the outer surface thereof spaced inwardly from and opposing said inner surface of the trough,
said opposed surfaces defining a passage therebetween for advancement of the tissue longitudinally of the trough;
means for supplying cleaning fluid to said passage;
a series of spaced-apart, elongated, and generally transversely arcuate corrugations on the outer surface of the element extending longitudinally thereof; and
a series of spaced-apart, elongated, and generally transversely arcuate corrugations on the inner surface of the trough extending longitudinally thereof and underlying the element for cooperating with the corrugations of the latter upon rotation of the element to gently squeeze and rub tissue advancing in said passage to clean the same.

13. The tissue cleaner as claimed in claim 12, wherein the corrugations on the trough and on the element, respectively, extend continuously from one end to the opposite end of the same.

14. The tissue cleaner as claimed in claim 13, wherein the corrugations on the trough and on the element, respectively, extend in parallel relationship with the axis of rotation of the element.

References Cited

UNITED STATES PATENTS

| | | | |
|---|---|---|---|
| 3,393,413 | 7/1968 | Walter | 17—43 X |
| 3,430,278 | 3/1969 | Walter et al. | 17—43 X |

FOREIGN PATENTS 22639  10/1930  Netherlands.

LUCIE H. LAUDENSLAGER, Primary Examiner

U.S. Cl. X.R.

15—3.13